US006614792B1

United States Patent
Pazy et al.

(10) Patent No.: US 6,614,792 B1
(45) Date of Patent: Sep. 2, 2003

(54) PROXY MPC FOR PROVIDING MPOA SERVICES TO LEGACY LANE CLIENTS IN AN ASYNCHRONOUS TRANSFER MODE NETWORK

(75) Inventors: Offer Pazy, Tel Aviv (IL); Opher Yaron, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,063

(22) Filed: May 27, 1999

(51) Int. Cl.[7] .............................. H04L 12/56; H04J 3/22

(52) U.S. Cl. ................... 370/395.53; 370/401; 370/466

(58) Field of Search .................... 370/395.5, 395.51, 370/395.53, 395.54, 395.2, 249, 395.1, 396, 397, 400, 401, 409, 466, 465

(56) References Cited

U.S. PATENT DOCUMENTS

| 4,823,338 A | 4/1989 | Chan et al. ................... 370/85 |
| 4,975,906 A | 12/1990 | Takiyasu et al. .......... 370/85.13 |
| 5,214,646 A | 5/1993 | Yacoby .................... 370/85.14 |
| 5,280,476 A | 1/1994 | Kojima et al. ............. 370/60.1 |
| 5,280,481 A | 1/1994 | Chang et al. ............. 370/85.13 |
| 5,291,477 A | 3/1994 | Liew ........................... 370/54 |
| 5,315,582 A | 5/1994 | Morizono et al. ............. 370/16 |
| 5,321,693 A | 6/1994 | Perlman .................... 370/85.13 |
| 5,321,694 A | 6/1994 | Chang et al. ............. 370/85.13 |
| 5,329,527 A | 7/1994 | Ujihashi et al. .......... 370/85.13 |
| 5,329,619 A | 7/1994 | Page et al. ................... 395/200 |

(List continued on next page.)

FOREIGN PATENT DOCUMENTS

| WO | WO97/04386 | 6/1997 | ........... G06F/9/455 |
| WO | WO98/02821 | 1/1998 | ........... G06F/13/00 |

OTHER PUBLICATIONS

Simpson, W., "IP in IP Tunneling", Request for Comments #153, Oct. 1995, 9 pages.

Swallow, G., "Frame Relay PVC Multicast Service and Protocol Description", FRF.7, Frame Relay From Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

(List continued on next page.)

Primary Examiner—Ricky Ngo
Assistant Examiner—Timothy Lee
(74) Attorney, Agent, or Firm—Howard Zaretsky

(57) ABSTRACT

A proxy MPOA client in a VLAN that is otherwise populated by legacy LECs such that the MPOA services for these LECs are provided centrally by the proxy MPC. A standard MPC enabled edge device is adapted to provide MPC services to legacy LECs that are not MPOA aware. Such an edge device provides MPOA services to legacy LECs located in other edge devices connected to the ATM cloud. The proxy MPC is configured to have at least two LECs: one residing on a legacy ELAN and another residing on an MPOA ELAN. Traffic from the legacy LEC arriving from the legacy ELAN is forwarded to an Ethernet port that is looped back to a second Ethernet port on the proxy MPC edge device. Upon ingress at the second Ethernet port, the traffic is treated as if it arrived from a regular port and provided with MPC services. The loopback may be implemented either internally or externally via one or more cables. In addition, an internal bridge is configured to steer the Ethernet traffic to the first Ethernet port for loopback to the second Ethernet port. Upon initial flow detection, the proxy MPC establishes a shortcut utilizing the MPOA Server (MPS). Once the shortcut is established, traffic is forwarded from the LEC on the MPOA side in the proxy MPC to the destination via the shortcut.

25 Claims, 8 Drawing Sheets

U.S. PATENT DOCUMENTS

| | | | |
|---|---|---|---|
| 5,345,558 A | 9/1994 | Opher et al. ................. | 395/200 |
| 5,361,256 A | 11/1994 | Doeringer et al. ............ | 370/60 |
| 5,390,184 A | 2/1995 | Morris ....................... | 370/94.2 |
| 5,394,402 A | 2/1995 | Ross ......................... | 370/94.1 |
| 5,408,469 A | 4/1995 | Opher et al. ................ | 370/60.1 |
| 5,420,862 A | 5/1995 | Perlman .................... | 370/85.13 |
| 5,444,702 A | 8/1995 | Burnett et al. .............. | 370/60.1 |
| 5,455,865 A | 10/1995 | Perlman ..................... | 380/49 |
| 5,483,536 A | 1/1996 | Gunji et al. ............. | 370/85.14 |
| 5,491,690 A | 2/1996 | Alfonsi et al. ................ | 370/60 |
| 5,495,479 A | 2/1996 | Galaand et al. ............... | 370/60 |
| 5,519,704 A | 5/1996 | Farinacci et al. ........ | 370/85.13 |
| 5,544,327 A | 8/1996 | Dan et al. .................... | 395/250 |
| 5,548,646 A | 8/1996 | Aziz et al. ..................... | 380/23 |
| 5,548,723 A | 8/1996 | Pettus .................... | 395/200.01 |
| 5,550,816 A | 8/1996 | Hardwick et al. ............ | 370/60 |
| 5,550,818 A | 8/1996 | Brackett et al. .............. | 370/60 |
| 5,566,014 A | 10/1996 | Glance ....................... | 359/124 |
| 5,583,865 A | 12/1996 | Esaki et al. ................. | 370/397 |
| 5,590,118 A | 12/1996 | Nederlof ..................... | 370/218 |
| 5,600,638 A | 2/1997 | Bertin et al. ................ | 370/351 |
| 5,600,644 A | 2/1997 | Chang et al. ............... | 370/404 |
| 5,603,029 A | 2/1997 | Aman et al. ................. | 395/675 |
| 5,629,930 A | 5/1997 | Beshai et al. ............... | 370/396 |
| 5,633,869 A | 5/1997 | Burnett et al. .............. | 370/396 |
| 5,649,108 A | 7/1997 | Spiegel et al. ......... | 305/200.12 |
| 5,659,542 A | 8/1997 | Bell et al. ................... | 370/496 |
| 5,666,487 A | 9/1997 | Goodman et al. ..... | 395/200.76 |
| 5,673,263 A | 9/1997 | Basso et al. ................ | 370/396 |
| 5,835,481 A | 11/1998 | Akyol et al. ................ | 370/216 |
| 5,870,589 A | 2/1999 | Alexander, Jr. et al. .... | 395/500 |
| 5,898,669 A | 4/1999 | Shimony et al. ............ | 370/232 |
| 5,909,441 A * | 6/1999 | Alexander et al. ..... | 370/395.53 |
| 6,081,836 A * | 6/2000 | Karapetkov et al. ........ | 345/418 |
| 6,169,739 B1 * | 1/2001 | Isoyama ................ | 370/395.52 |
| 6,178,171 B1 * | 1/2001 | Alexander et al. ..... | 370/395.53 |
| 6,411,625 B1 * | 6/2002 | Furuhashi et al. ..... | 370/395.53 |
| 6,452,921 B1 * | 9/2002 | Alexander et al. .......... | 204/400 |

OTHER PUBLICATIONS

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B–22.

Multi–Protocol Over ATM Ver. 1.0 Specification AF–M-POA–0087.000, May 29, 1997, pp. 17–24.

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doering, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed form website http://www.stw.nl/projecten/T/tel3997.html, 2 pages, Feb. 2, 1997.

"LAN Emulation Over ATM Version 2—LNNI Specification", ATM Forum Technical Committee, af–lane–0112.000, Feb. 1999, 3 pages.

* cited by examiner

PROXY MPC FOR PROVIDING MPOA SERVICES TO LEGACY LANE CLIENTS IN AN ASYNCHRONOUS TRANSFER MODE NETWORK

FIELD OF THE INVENTION

The present invention relates generally to data communications networks and more particularly relates to a system for providing MPOA services to legacy LANE clients by establishing one or more proxy MPCs.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

MPOA

Currently, networks are becoming more and more important to knowledge based enterprises. The demands of traffic growth and new applications are increasing at a fast pace spurred by the remarkable growth of the Internet and intranets as well as client/server and multimedia applications. Multiprotocol Over ATM (MPOA) is a specification from the ATM Forum that leverages standard based ATM switching to provide high performance, scalable layer-3 forwarding in a routed environment. MOPA functions to map routed and bridged flows of traffic to ATM switched virtual circuits (SVCs). This off loads traditional routers from performing packet by packet processing. Even routers considered fast today, i.e., millions of packet/sec, are becoming bottlenecks for cross subnet traffic generated by heavy Internet, intranet and multimedia traffic. Using MPOA, overall latency and end-to-end delay variation are improved for routed traffic.

MPOA provides for the efficient transfer of unicast data across subnets which are based on LAN Emulation (LANE). MPOA integrates LANE and Next Hop Resolution Protocol (NHRP) to preserve the benefits of LAN Emulation, while allowing inter-subnet, internetwork layer protocol communication over ATM Virtual Channel Connections (VCCs) without requiring routers in the data path. MPOA provides a framework for effectively synthesizing bridging and routing with ATM in an environment of diverse protocols, network technologies, and IEEE 802.1 Virtual LANs (VLANs). This framework provides a unified paradigm for overlaying internetwork layer protocols on ATM. A system comprised of MPOA and LANE is capable of using both routing and bridging information to locate the optimal exit from the ATM network.

In addition, the route determination and packet filtering performed by routers cause delays to be introduced. The larger the number of hops needed to get to the destination, the larger the delay variation. In a connectionless environment, each frame of data required address computations within the router that is repeated at every router hop in the network. Thus, each router must run the full routing stack. This is expensive in terms of resources, cost and management demands.

MPOA operates in routed networks. By interacting with traditional routers, MPOA entities obtain the needed information to create shortcuts between source and destination, thereby eliminating the performance limitations of hop-by-hop forwarding. MPOA functions to set up shortcut connections over the ATM network from any MPOA capable host or edge device to any other, regardless of the device's membership in a subnet. Using shortcuts over the ATM network provides a significant improvement in performance over pure router based inter-subnet solutions. The packets sent over the shortcut are not subjected to hop by hop router processing.

In general, MPOA splits the forwarding and routing functions that are typically performed within a single router unit. Traffic forwarding functions are performed by MPOA clients (MPCs). Routing information is obtained by the MPOA servers (MPSs) which are co-located with the router. MPCs typically are located in edge devices and ATM attached hosts. Thus, the physical devices that calculate the route and those that forward the data are separated. This results in the use of the ATM network as a high speed forwarding infrastructure.

The benefits of the virtual routing features provided by MPOA include: (1) allowing efficient inter-subnet communication; (2) increasing manageability by decreasing the number of devices that must be configured to perform internetwork layer route calculations; (3) increasing scalability by reducing the number of devices participating in interwork layer route calculations; and (4) reducing the complexity of edge devices by eliminating the need to perform internetwork layer route calculations (since without MPOA, routers would be needed in place of most of the LAN Emulation Clients (LECs)).

Further information about MPOA is available in the Multi-Protocol Over ATM Version 1.0 Specification AF-MPOA-0087.000, May 29, 1997, issued by the ATM Forum.

SUMMARY OF THE INVENTION

The proxy MPC of the present invention serves to facilitate a smooth migration to MPOA based networks. Slowing down the migration towards MPOA based networks is the existence of a large number of legacy LECs that are not MPOA aware and cannot be upgraded (since the LEC functionality is usually performed in hardware). The present invention provides a proxy MPOA client in a VLAN that is otherwise populated by legacy LECs such that the MPOA services for these LECs is provided centrally by the proxy MPC.

A standard MPC-enabled edge device is designed to service the devices which are connected to its LAN ports. Such an edge device, however, can be modified so as to provide MPOA services to edge devices located in other chassis or any other edge devices connected to the ATM network.

The proxy MPC of the present invention is operative to provide MPOA Client services to one or more LECs that are not MPOA aware. The proxy MPC is configured to have at least two LECs: one residing on an Emulated LAN (ELAN) which otherwise is made entirely of legacy LECs (the 'legacy ELAN'), and another residing on an 'MPOA ELAN' (an ELAN that is made of MPOA entities only). Traffic from the legacy LEC arriving on the legacy ELAN is forwarded to an Ethernet port. The Ethernet port is looped back to a second Ethernet port connected to the proxy MPC. Upon ingress at the second Ethernet port, the traffic is treated as if it arrived from a regular port and thus is provided with all the standard MPC services. Note that the loopback may be implemented either internally or externally via one or more cables. In addition, an internal bridge is configured to steer the Ethernet traffic to the first Ethernet port for loopback to the second Ethernet port.

Upon initial flow detection, the proxy MPC establishes a shortcut utilizing the MPOA Server (MPS). Once the shortcut is established, traffic is forwarded from the LEC on the MPOA side in the proxy MPC to the destination via the shortcut. As a result, a frame coming from a port located on a legacy LEC is forwarded to its destination using the ATM network only without 'visiting' the routers in its path.

As part of the standard MPOA functionality, the required processing of the layer-3 packet (e.g., in the case of IP, TTL decrement, SA MAC substitution, and CRC recalculation) is performing in the MPC. In addition, and also based on the MPOA standard, IP packets with options are still being forwarded to the next hop router for processing.

Throughout this document, the term 'Legacy ELAN' denotes an ELAN comprising one or more legacy LECs and a single proxy MPC. A legacy LEC is a LEC that is not MPOA aware or capable. Note that the term serviced LEC is also used to denote a legacy LEC. The term 'MPOA ELAN' denotes an ELAN that comprises a proxy MPC, zero or more MPCs and one or more MPSs. The term MPC by itself denotes an MPC other than a proxy MPC.

There is provided in accordance with the present invention a proxy Multiprotocol Over ATM (MPOA) Client (MPC) for use in an ATM network including one or more legacy LAN Emulation Clients (LECs) that are not MPOA aware and at least one MPOA Server (MPS) comprising a first port adapted to transmit/receive data to/from a first Emulated LAN (ELAN), a second port adapted to transmit/receive data to/from a second ELAN, a first LEC adapted to reside on the first ELAN, the legacy LEC also residing on the first ELAN, a second LEC adapted to reside on the second ELAN, the MPS also residing on the second ELAN, a loopback connection adapted to loopback the first port and the second port such that traffic ingressed to the second port is treated as regular frames and provided MPC services; and a bridge adapted to steer traffic ingressing from the first ELAN via the first LEC over the loopback to egress to the second ELAN via the second LEC, the bridge adapted to steer traffic ingressing from the second ELAN via the second LEC over the loopback to egress to the first ELAN via the first LEC.

The bridge includes a first Forwarding Database (FDB) adapted to store mappings between the first ELAN and the first port for both ingress and egress directions and a second Forwarding Database (FDB) adapted to store mappings between the second ELAN and the second port for both ingress and egress directions.

There is also provided in accordance with the present invention, in an Asynchronous Transfer Mode (ATM) network including at least one Multiprotocol Over ATM (MPOA) Server (MPS), a method of providing proxy MPOA Client (MPC) services to one or more legacy LAN Emulation Clients (LECs) that are not MPOA aware, the method comprising the steps of forwarding frames from a legacy LEC to a first LEC, the first LEC and the legacy LEC residing on a first ELAN, forwarding frames arriving to the first LEC to a first port and providing a second port adapted to transmit/receive data to/from a second ELAN, configuring a bridge so as to forward traffic arriving from the legacy LEC to the first port and to forward traffic ingressed to the second port to the MPS and looping back traffic arriving to the first port to a second port thus causing traffic ingressed to the second port to be provided MPC services.

The method further comprises the step of forwarding traffic to the MPS before an MPOA shortcut is established upon detecting initial traffic flow. The method further comprises the step of forwarding traffic to an MPOA shortcut once the MPOA shortcut is established. The method further comprises the step of communicating frames from the legacy LEC to the first LEC via a LAN Emulation (LANE) Data Direct Virtual Circuit (DDVC). The method further comprises the step of forwarding frames from a second LEC associated with the second port to the MPS via a LAN Emulation (LANE) Data Direct Virtual Circuit (DDVC).

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
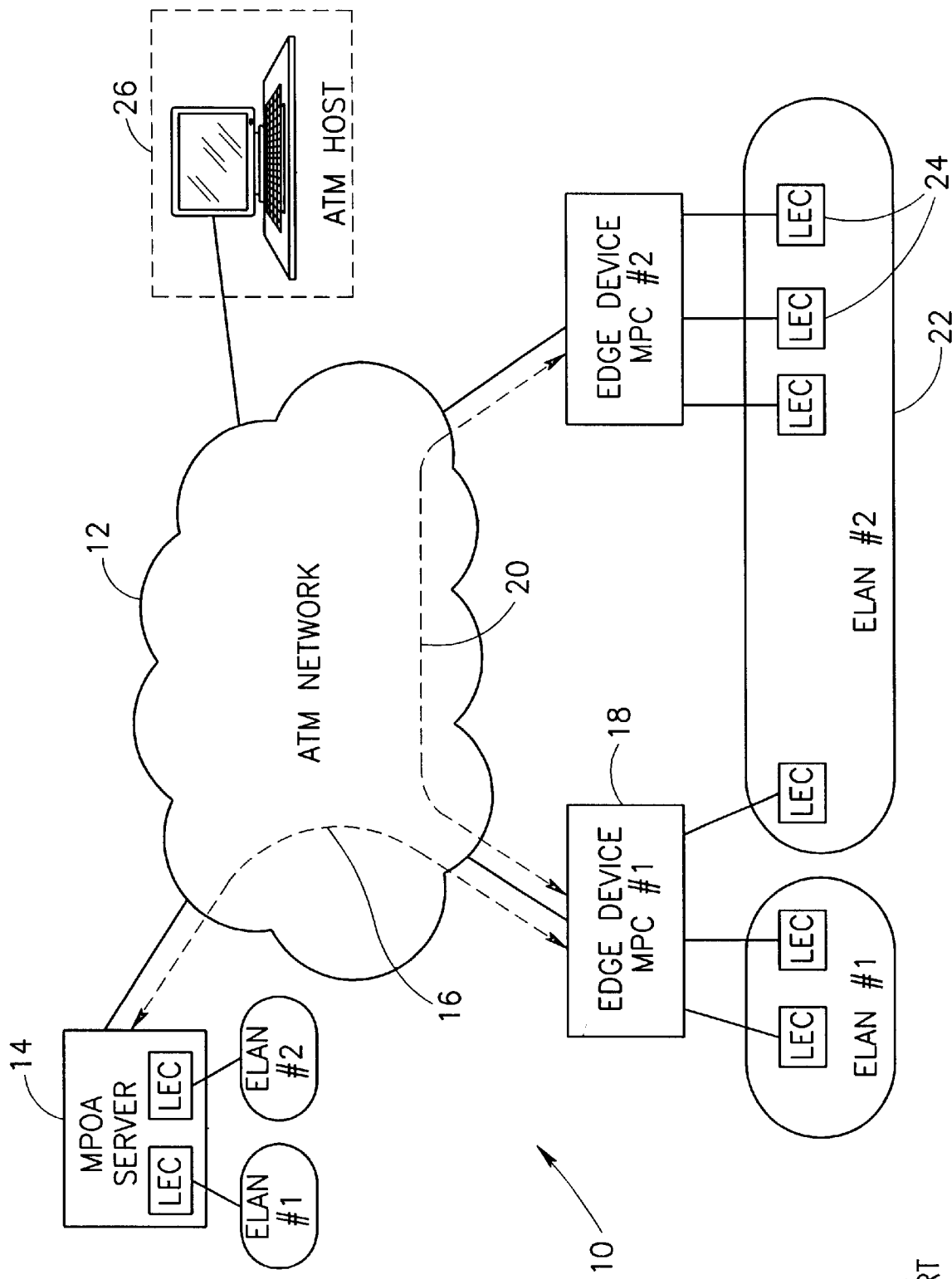
FIG. 1 is a block diagram illustrating the operation of standard MPOA services over an example ATM network.

The following notation is used throughout this document.

| Term | Definition |
| --- | --- |
| ANSI | American National Standards Institute |
| ARP | Address Resolution Protocol |
| ATM | Asynchronous Transfer Mode |
| BUS | Broadcast and Unknown Server |
| CCITT | Comite Consulatif International Telegraphique et Telephonique |
| CRC | Cyclic Redundancy Check |
| DDVC | Data Direct Virtual Circuit |
| ELAN | Emulated LAN |
| FDB | Forwarding Database |
| FDDI | Fiber Distributed Data Interface |
| IETF | Internet Engineering Task Force |
| IISP | Interim Inter-Switch Signaling Protocol |
| IP | Internet Protocol |
| ITU | International Telecommunications Union |
| LAG | Local Address Group |
| LANE | LAN Emulation |
| LEC | LAN Emulation Client |
| LES | LAN Emulation Server |
| LIS | Logical IP Subnet |
| MAC | Media Access Control |
| MPC | MPOA Client |
| MPOA | Multiprotocol Over ATM |
| MPS | MPOA Server |
| NHC | Next Hop Client |
| NHRP | Next Hop Resolution Protocol |
| NHS | Next Hop Server |
| OSPF | Open Shortest Path First |
| RIP | Routing Information Protocol |
| SVC | Switched Virtual Circuit |
| TTL | Time To Live |
| UNI | User to Network Interface |
| VCC | Virtual Channel Connection |
| VLAN | Virtual LAN |

General Description

The present invention is a system for providing MPOA services to legacy LANE clients utilizing one or more proxy MPCs. The present invention is applicable in ATM networks that utilize MPOA servers and MPOA clients to provide MPOA services to a plurality of users. Using the system of the present invention, legacy clients not connected to an edge device incorporating an MPC can receive MPOA services they would otherwise not be able to take advantage of.

Note that throughout this document, the term 'serviced LEC' is used to denote a LEC which is not MPOA aware and is therefore using the MPOA client capabilities of a connected proxy MPC.

MPOA

To aid in understanding the principles of the present invention a brief review of MPOA services is provided. MPOA utilizes LAN Emulation (LANE) from the ATM Forum, Next Hop Resolution Protocol (NHRP) defined by the Internet Engineering Task Force (IETF) and the concept of the virtual router. LANE is used for intra-subnet communications while the MPOA virtual router provides communication between subnets. The NHRP allows the packet forwarding function of intermediate routers on the data path to be bypassed. An extended address resolution protocol is provided by NHRP that allows Next Hop Clients (NHCs) to send queries between different logical IP subnets (LISs), also referred to as Local Address Groups (LAGs). Queries are propagated using Next Hop Servers (NHSs) along paths discovered using standard routing protocols such as RIP and OSPF. This permits the establishment of ATM switched virtual circuits across subnet boundaries, allowing inter-subnet communications without the use of intermediate routers.

The MPCs are located in the edge devices or attached ATM hosts and their main function is to function as a point of entry and exit for traffic into the multi-subnet network. When an MPC detects a traffic flow, it requests the MPS serving it to find a shortcut. If one is found, the MPC sets up an SVC and forwards data to the destination across the shortcut. Note that the MPS and MPC communicate with each other via NHRP.

The MPOA concept serves to distribute forwarding information among the edge devices and ATM attached hosts with MPOA clients which function to forward packets, while MPOA servers provide forwarding information. In operation, the MPCs examine the destination address of packets received from LAN segments in order to make the correct forwarding decision. If the packet is to be routed, it contains the destination MAC address of the next-hop router.

If the packet is to be routed, the MPC examines the destination network layer address of the packet and resolves this to the correct ATM address based on information received from the MPOA server. The MPC then establishes a switched virtual circuit (SVC) to the ATM destination or uses an existing one. If the packet is destined to a host in the same subnet so that it can be bridged, the MPC will utilize LANE to resolve that ATM address and will either use an existing SVC to the destination or establish a new one.

Note that if the MPOA server does not know the destination ATM address, it propagates the query to other MPSs using NHRP. The destination ATM address returned from the MPS can be (1) the address of the host (if the host is an attached ATM host) or (2) the address of the edge device to which the destination end station is connected.

A block diagram showing the operation of standard MPOA services over an example ATM network is presented for illustration purposes in FIG. 1. The network, generally referenced 10, comprises an ATM cloud 12, edge devices 18, labeled edge device #1 and edge device #2, incorporating MPCs, labeled MPC #1 and MPC #2, MPS 14 and ATM host 26. Each MPC has a number of LECs 24. The LECs 24 are grouped into two ELANs 22, labeled ELAN #1 and ELAN #2. The MPOA server 14 includes, among other things, two LECs, one being a member of ELAN #1 and one being a member of ELAN #2.

Assume that a LEC in ELAN #1 desires to send data to a LEC (on ELAN #2) that is inside edge device #2. The first time that data traffic is to be forwarded from edge device #1, it is forwarded to the MPOA server 14 via a LANE data direct virtual circuit (DDVC) or SVC 16.

To set up a shortcut connection (20), MPC #1 obtains the ATM address of the exit point to which the destination host is connected. The destination host is a host with a network layer address. The MPS returns the ATM address of edge device #2 which is connected to the destination host. This communication occurs utilizing the NHRP protocol.

Once the shortcut 20 has been established, the ingress MPC, i.e., MPC #1, strips off the Layer 2 encapsulation from the packet and sends it via the shortcut 20. Upon arriving to the egress MPC, i.e., MPC #2, over the shortcut, the packet is examined and the packet is re-encapsulated and forwarded via ELAN #2 to the destination LEC.

Figure 2:
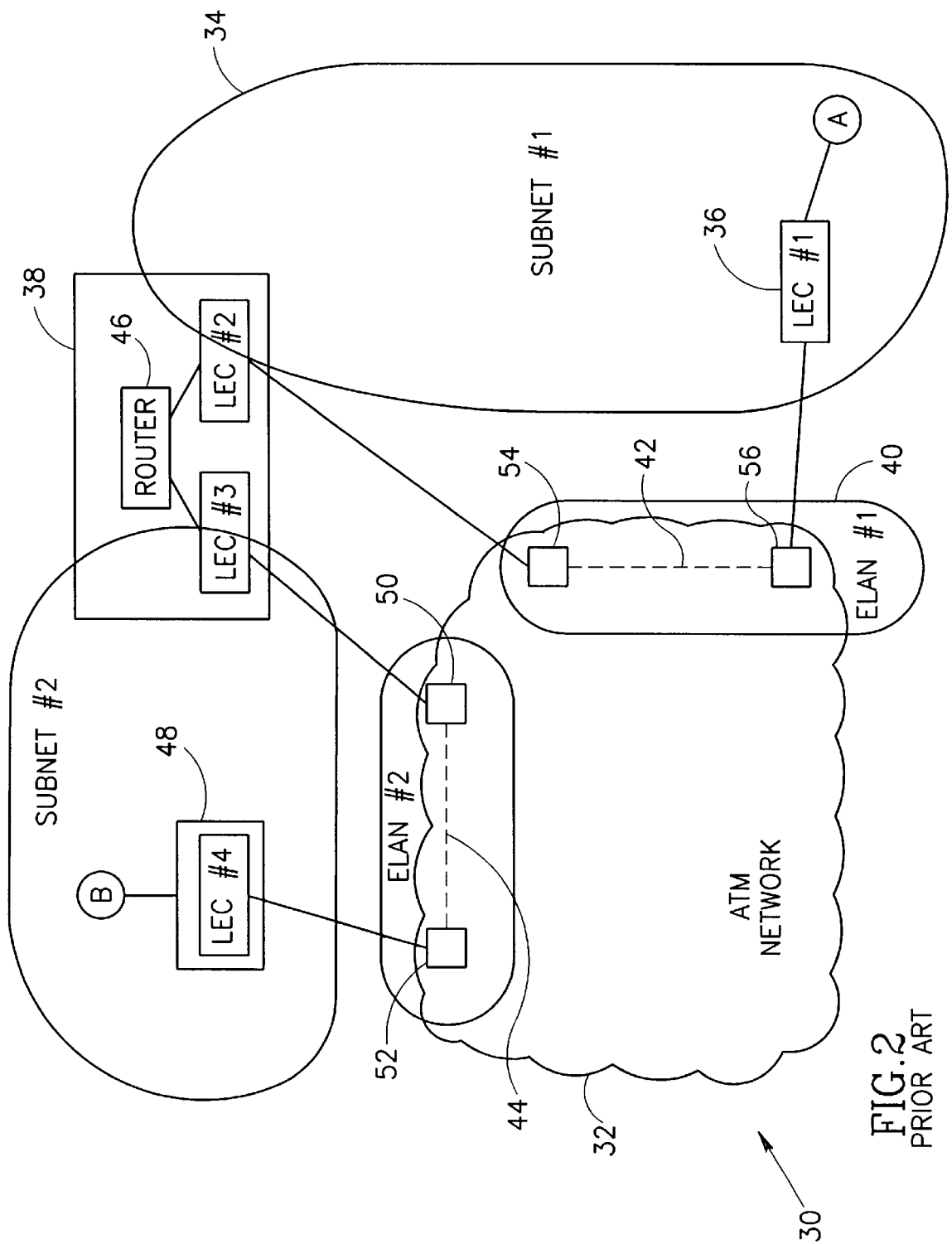
FIG. 2 is a block diagram illustrating the standard routing between LECs located in different subnets.

A block diagram of a network shown to illustrate the standard routing between LECs located in different subnets is shown in FIG. 2. The network, generally referenced 30, comprises an ATM cloud 32, subnets 34, labeled subnet #1 and subnet #2, ELANs 40, labeled ELAN #1 and ELAN #2, a plurality of LECs 36, labeled LEC #1 through LEC #4 and an edge device 38 comprising a router 46 and two LECs, each on a different subnet. ELAN #1 and #2 comprise a plurality of nodes 54, 56 and 50, 52, respectively (only two are shown for clarity sake). Subnet #1 is shown comprising an associated VLAN that includes LEC #1 with a source user A attached. Subnet #2 comprises an edge device 48, an associated VLAN that includes LEC #4 and a destination user B attached to the edge device.

In normal prior art LANE operation, a frame from end station A that is destined to another subnet, i.e., subnet #2, is sent via LEC #1 to LEC #2 via a DDVC 42 between nodes 54 and 56. Note that for illustrative purposes, LEC #1, LEC #2 are shown separate from nodes 56, 54, respectively. In actuality, however, they are not separated and comprise a single entity.

LEC #2 is the LEC that services the router 46 on subnet #1. LEC #2 sends the frame to the upper layer (Layer 3) for forwarding. Note that the MAC address of the router is already known and a DDVC 42 to it was previously established. The DDVC is set up when frames arrive at LEC #1 having a MAC destination address of the router (which was previously discovered using standard LANE LE_ARP).

At the router 46, the packet is handled in the normal manner, i.e., the IP destination address is examined and standard routing is performed. The frame is then processed by the router 46 which, after performing the forwarding operation, sends the frame to LEC #3 which serves subnet #2. LEC #3, in turn, forwards the frame to LEC #4 via DDVC 44 between nodes 50, 52. Finally, the frame is forwarded to end station B attached to edge device 48.

Proxy MPOA Client

Figure 3:
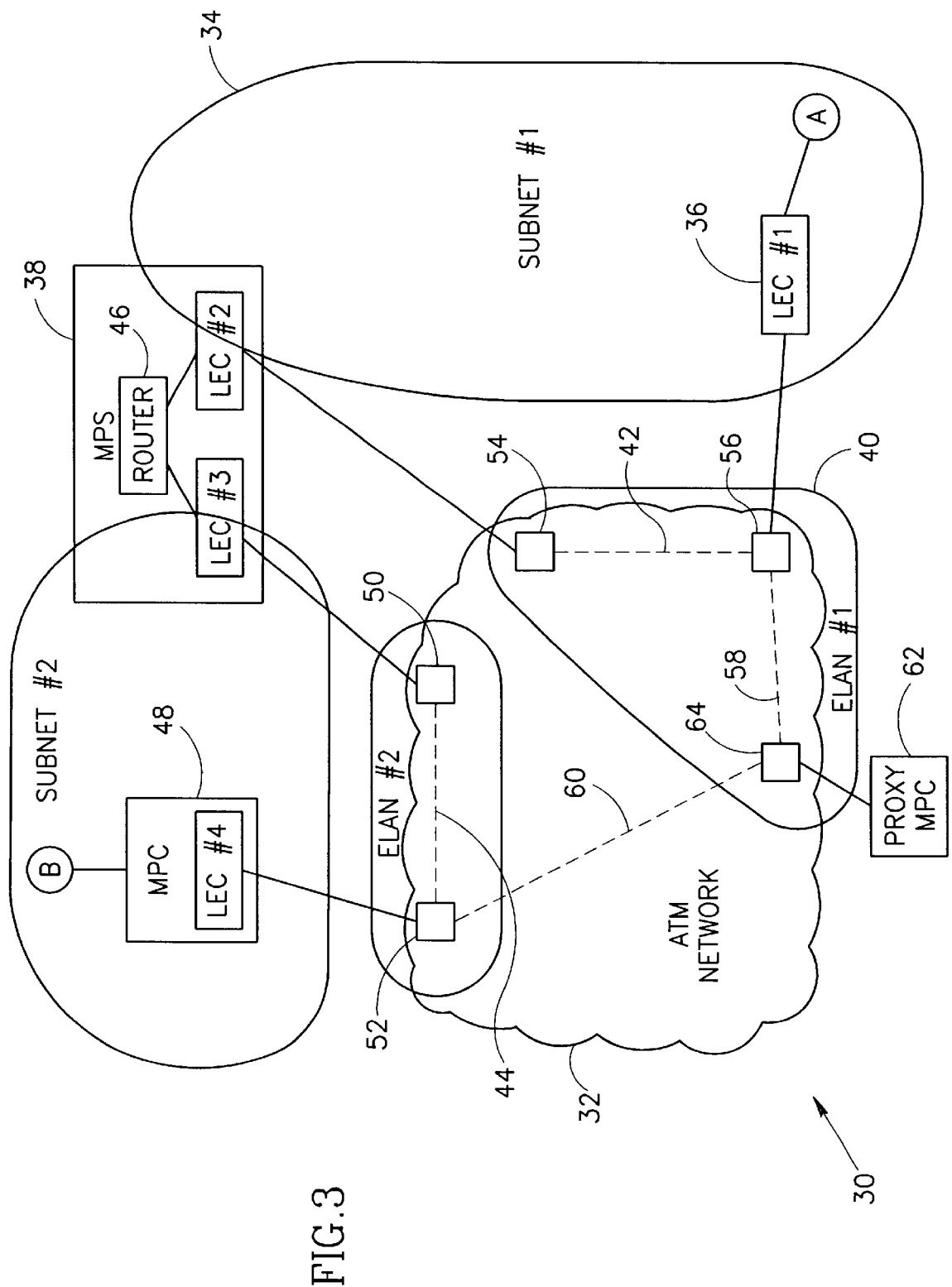
FIG. 3 is a block diagram illustrating the operation of the proxy MPC of the present invention within an example ATM network.

The following description of the invention is presented in the context of Layer 2 Ethernet. Note, however, that one skilled in the art can apply the principles of the present invention to other Layer 2 protocols as well. A block diagram illustrating the operation of the proxy MPC of the present invention within an example ATM network is shown in FIG. 3. The network 30 shown in FIG. 3 is the same as that shown in FIG. 2 with the exception that edge device 38 now includes a MPOA server; edge device 48 now includes an MPOA client; and a proxy MPOA client 62 attached to node 64 which is part of ELAN #1 is added. Note that for illustrative purposes, proxy MPC 62 and node 64 are shown separated. In actuality, however, they are not separated and comprise a single entity.

With the proxy MPC in place in the network 30, the frames from end station A take a different path towards the destination station B. Previously, the frames traveled through the DDVC 42 to the LEC #2, through the router 46, through LEC #3 to LEC #4 via DDVC 44 and then to the destination B. In accordance with the present invention, after the initial phase, the frames are sent to LEC #1 which forwards them on a DDVC 58 to the proxy MPC 62 and from there, via hardware in the proxy MPC 62, on an MPOA shortcut 60 directly to the LEC #4 in edge device 48 and finally to the destination B. A key point is that the data traffic bypasses the router 46 and intermediate LECs and instead is sent over the shortcut SVC 60.

The proxy MPC mechanism will now be described in more detail. A block diagram illustrating the proxy MPC mechanism of the present invention is shown in greater detail in FIG. 4. In operation, a frame from a source user A connected to an Ethernet port on edge device 74 containing the serviced LEC #1 92 is forwarded to the LEC #2 90 over a LANE DDVC 98 to the proxy MPC edge device 72. Note that LEC #1 and LEC #2 are both members of a legacy ELAN #1 78 and that LEC #1 normally does not have access to MPOA services.

The proxy LEC #2 forwards the frame to one of its Ethernet ports. The frame is looped back (as represented by arrow 94) to another Ethernet port in the same device 72 but associated with a LEC #3 86. Note that the loopback may be internal or external via one or more cables. It is important that the ports on either end of the loopback be in different ELANs. Note that the LEC to proxy MPC is not necessarily limited to a one to one relationship. There can be any number of LECs that utilize the same MPC as a proxy MPC.

When the frame ingresses back to the device 72, it is treated as if it was a regular frame coming from one of its Ethernet ports and is provided with all the standard MPOA client services from MPC 84. Ultimately, a shortcut to the destination is established via an SVC over the ATM network.

Figure 4:
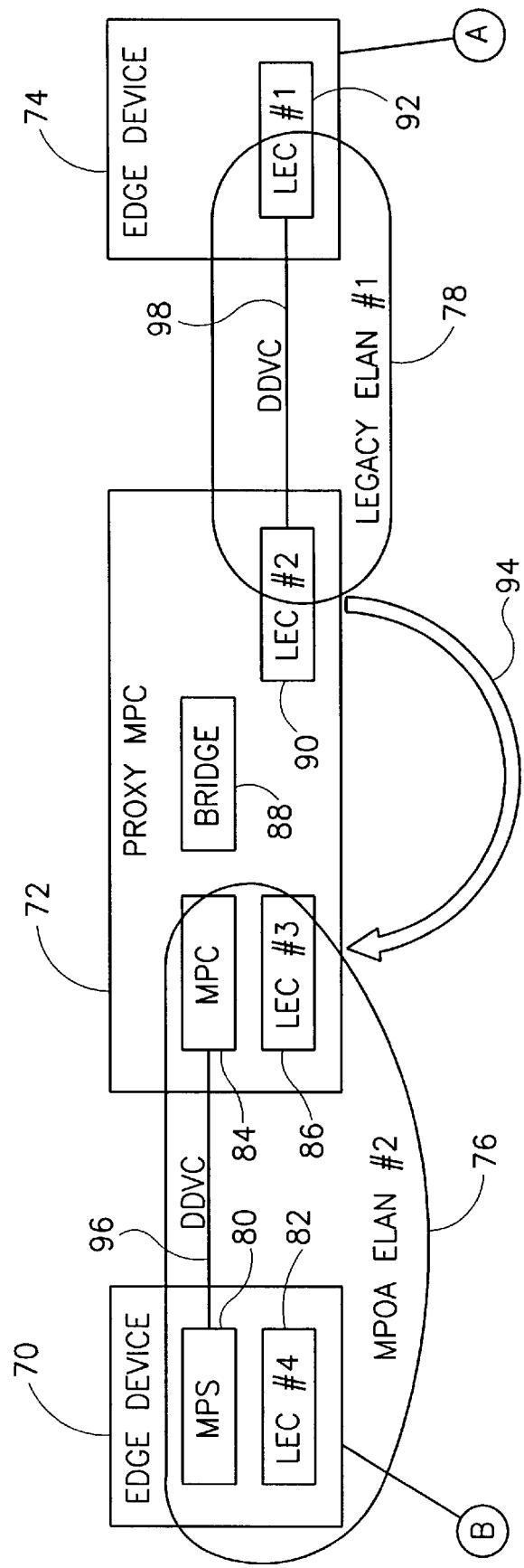
FIG. 4 is a block diagram illustrating the proxy MPC mechanism of the present invention in more detail.

FIG. 4 illustrates the active components when the edge device 72 functions as a proxy MPC. The edge device 74 contains a standard LEC, i.e., LEC #1. The edge device 72 comprises two LECs: (1) LEC #2 which resides on the same ELAN #1 as LEC #1 and (2) LEC #3 which resides on an ELAN #2 which also comprises the MPS 80 in edge device 70. Ethernet frames with the MAC destination address of the router ingress the edge device 74 and are forwarded to LEC #2 over DDVC 98 of ELAN #1. This occurs because the MAC address of the router was learned by the edge device 74 to be on the legacy ELAN #1 side.

When the frame reaches LEC #2, it is forwarded to one of the Ethernet ports since the MAC address of the router was learned to be on the port. The port is looped back to another port on the device, as represented by the arrow 94. When the frame is looped back and arrives at the port, it is serviced by LEC #3 which forwards it to the MPOA Server 80 on the DDVC 96 on ELAN #2 76. At this point standard MPOA flow detection occurs as if the packet was part of a normal Ethernet traffic. From this point on, standard MPOA operates as normal.

The loopback is configured in the edge device 72 utilizing the internal bridge functionality. The bridge maintains and utilizes one or more forwarding databases (FDBs). Each VLAN the bridge supports or participates in may utilize a different FDB. Thus, different VLANs (and hence ELANs) have different FDBs. The FDB provides the port to go out on to reach the router. The MAC address of the router is thus maintained in the FDB.

In accordance with the present invention, the MPC is spoofed to think that the Ethernet input data is from a local device, even though the data originated from the remote LEC (LEC #1) that does not have MPC capabilities.

To summarize, the frame ingress path is from the Ethernet port on the legacy LEC #1, bridged to DDVC on ELAN #1 to LEC #2, bridged to an Ethernet port and looped back to LEC #3, forwarded over DDVC on ELAN #2 to the MPS (before an MPOA shortcut has been established) or over the MPOA shortcut to the egress MPC (after an MPOA shortcut has been established). Note that frames in the reverse direction are forwarded similarly.

Figure 5:
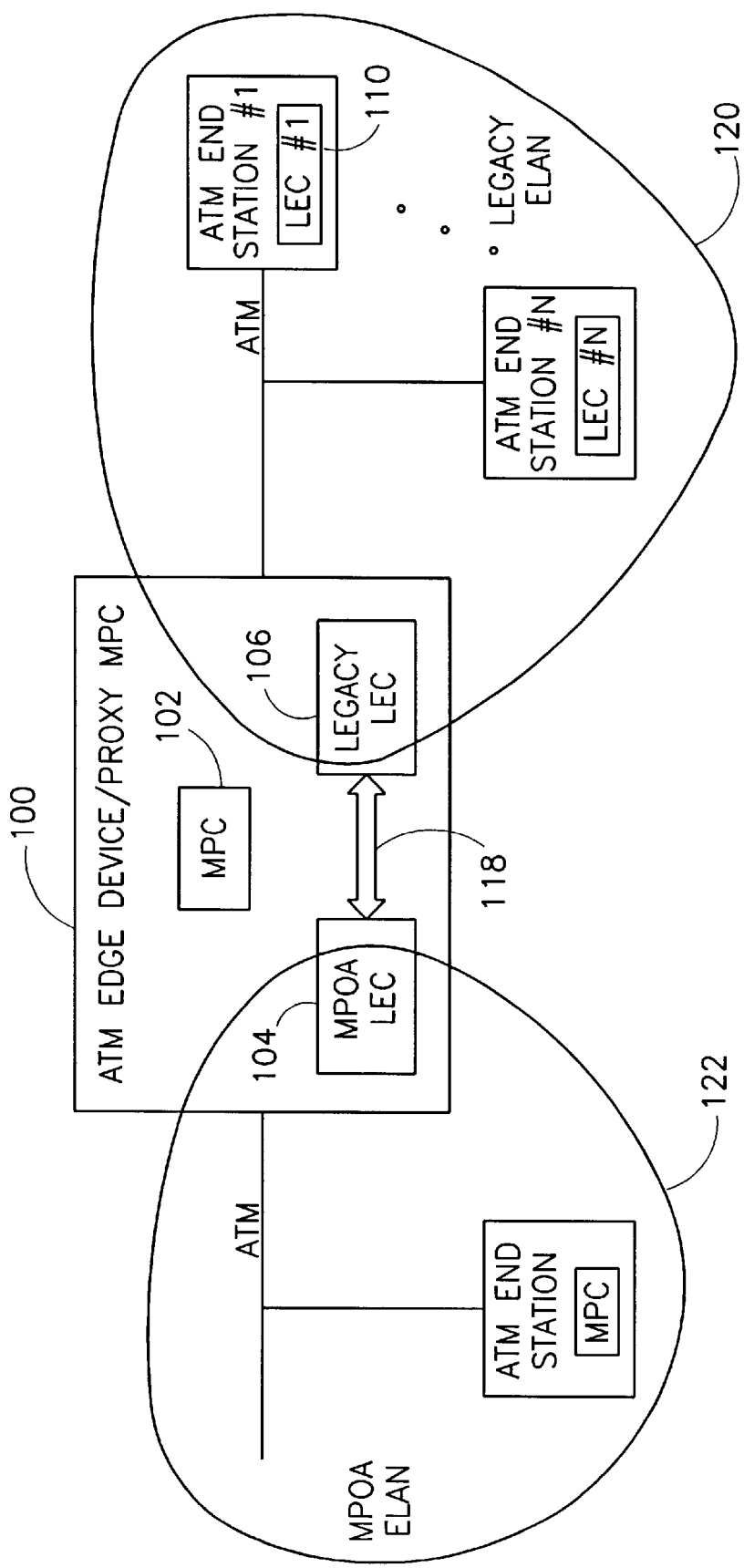
FIG. 5 is a block diagram illustrating an ATM edge device containing a proxy MPC attached to both a legacy ELAN and an MPOA ELAN.

A block diagram illustrating an ATM edge device containing a proxy MPC attached to both a legacy ELAN and an MPOA ELAN is shown in FIG. 5. Each VLAN serviced by the proxy MPC has associated with it a triple consisting of (1) the LEC 106 for the legacy ELAN 120, (2) a proxy MPC 102 and (3) the LEC 104 for the MPOA ELAN 122. These components are located in the proxy MPC edge device 100 wherein Ethernet ports are looped back between the legacy LEC and the MPOA LEC (as represented by the double headed arrow 118).

Each subnet, i.e., VLAN, is configured in two distinct ELANs which together are referred to as an ELAN pair. The first ELAN (side) of the pair, i.e., the legacy ELAN, is comprised of all the legacy LECs and a single proxy MPC. Note that the reference to legacy denotes the fact that the LECs are not MPOA capable.

The other ELAN, i.e., the MPOA ELAN, comprises the proxy MPC, zero or more MPCs (non proxy MPCs) and one or more MPSs. The two ELANs in the pair do not share any common entity except the single proxy MPC which is present in both and functions as the link between them.

Figure 6:
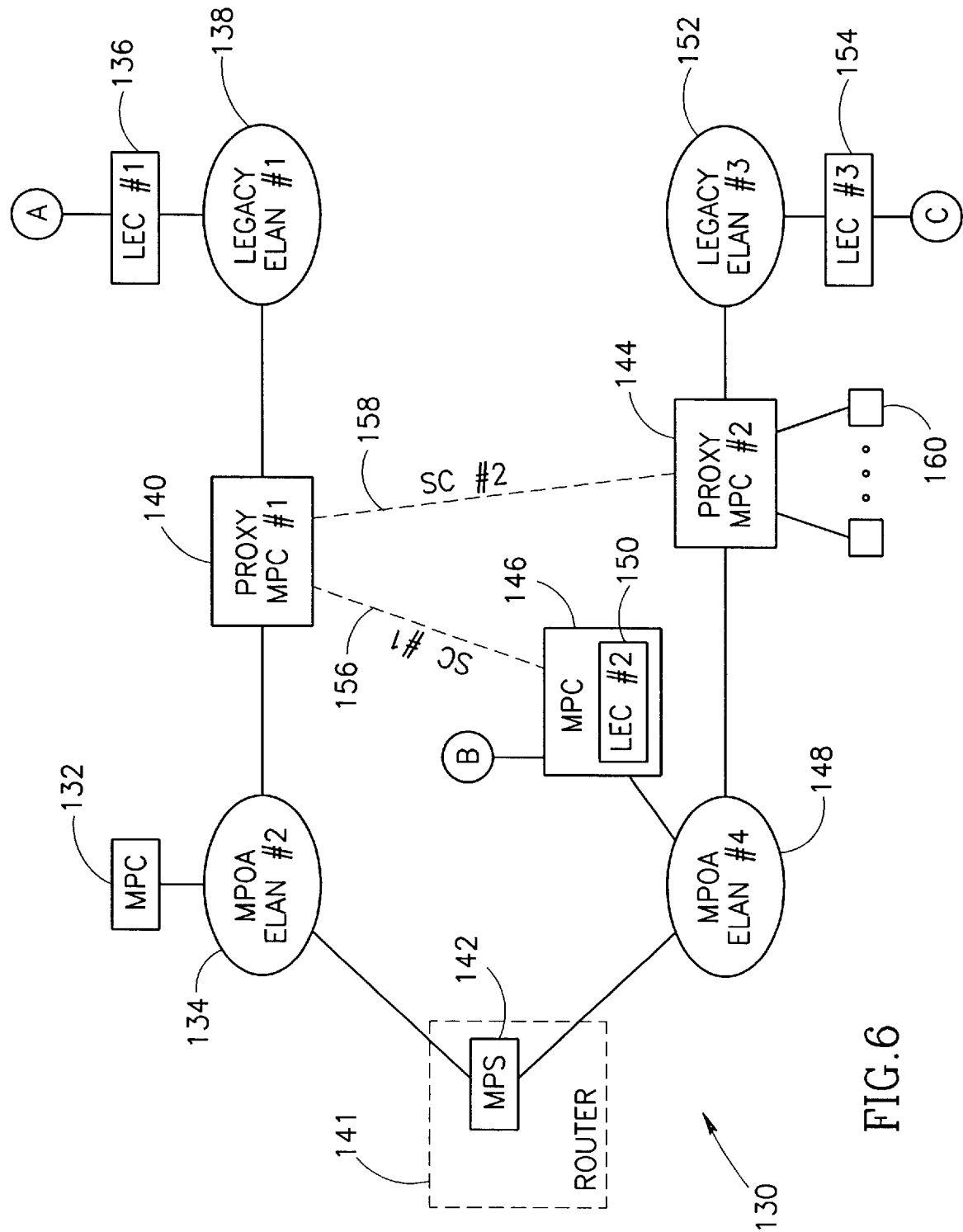
FIG. 6 is a block diagram illustrating an example application of the proxy MPC of the present invention as applied in an ATM network.

A block diagram illustrating an example application of the proxy MPC of the present invention as applied in an ATM network is shown in FIG. 6. The network, generally referenced 130, depicts a shortcut 156, referenced SC #1, between proxy MPC 140, labeled proxy MPC #1, and MPC 146; and another shortcut 158, referenced SC #2, between two proxy MPCs 140, 144, labeled proxy MPC #1 and proxy MPC #2. The packet flow for these shortcuts will now be described. As was described in connection with FIG. 2, when no MPC is present, frames from an end station in one VLAN (connected via a legacy LEC) to an end station in another VLAN will go through the normal path used by LANE, i.e., over a DDVC to the router and from there to the destination over a different DDVC.

When the configuration incorporates a proxy MPC, intra-VLAN traffic is forwarded normally. When, however, end station A sends a frame to end station B (which belongs to another subnet), the MAC destination address of the frame is that of the router 141, which in this case, resides 'behind' proxy MPC #1 on ELAN #2 134. The frame is therefore forwarded via a DDVC to the proxy MPC's LEC (not shown) on ELAN #1 138.

The proxy MPC then employs its flow detection mechanism. Before an MPOA shortcut is established, the frame is sent over a LANE DDVC in ELAN #2 from the proxy MPC #1 to the MPS 142. The frame is then sent to LEC #2 150 in edge device 146 via any intervening MPSs (not shown). LEC #2 on ELAN #4 148 services in the LEC that services end station B. In accordance with standard MPOA, when a flow in detected, a shortcut (SC #1) is established between proxy MPC #1 and the MPC in edge device 146 utilizing LEC #2. LEC #2 then forwards the frame to end station B.

The above described scenario occurs when the end station is situated behind an MPC. If, on the other hand, end station A sends the frame to end station C, which is behind a legacy LEC #3 154, the frame is sent on a shortcut (SC #2) between proxy MPC #1 and proxy MPC #2 144. Proxy MPC #2, acting as a proxy, then forwards the frame to end station C via ELAN #3 152. Note that proxy MPCs may also have end stations directly connected to it. For example, a plurality of end stations 160 are connected to proxy MPC #2.

Figure 7:
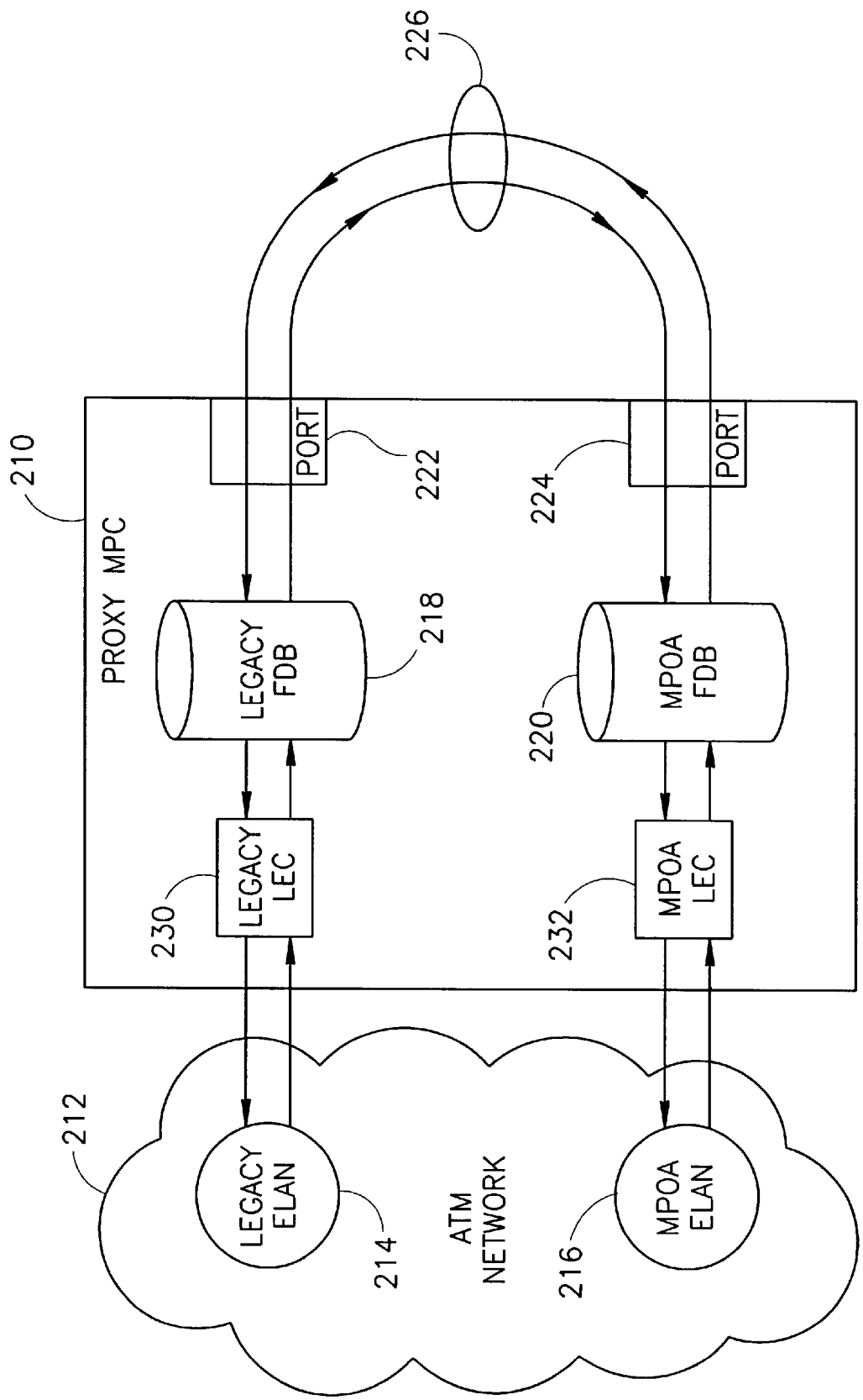
FIG. 7 is a block diagram illustrating the loopback mechanism of the proxy MPC in more detail.

A block diagram illustrating the loopback mechanism of the proxy MPC in more detail is shown in FIG. 7. As described above, the loopback in the edge device containing the proxy MPC is performed via configuration of one or more forwarding databases (FDBs) in the device. Each FDB comprises a plurality of records, with each record comprising at least two entries: a MAC address and a physical port. Note also that the FDB is configured for ingress as well as egress traffic.

As described above, the loopback on the proxy MPC may be internal or external. In the latter case, the loopback comprises two physical ports with a cable connecting them. A person must physically reconnect wires when the needs of the network changes, e.g., bandwidth improvements, etc.

The invention provides for an internal loopback that can be used to dynamically configure the device via software (including subnet membership) at boot time or run time. Ports can be dynamically configured to function either as loopback or as real ports serving real external end stations.

In the case of an internal loopback, each of the one or more bridges in the device includes an entry for the destination address of the router in each of its FDBs. The proxy MPC 210 comprises at least two FDBs 218, 220, one a legacy FDB associated with a legacy ELAN 214 and the other an MPOA FDB 220 associated with an MPOA ELAN 216. Both ELANs, 214 and 216, are in the ATM network 212.

The legacy FDB is used to find port 222 which is serviced by legacy LEC 230 on the legacy ELAN. When the frame returns from loopback 226, the MPOA FDB 220 is searched to find the DDVC from the MPOA LEC 232 to the LEC associated with the MPS (not shown) on the MPOA ELAN.

Note that the proxy MPC 210 functions as a bridge in that it bridges the two ELANs 214, 216. Also, for each VLAN, an extra legacy ELAN is required. Thus, the number of ELANs in the network may sometimes be doubled. Since two ELANs are defined for each subnet, broadcast and unknown packets in that subnet are flooded independently by the BUS of each ELAN. Note also that each proxy MPC can serve more than one pair of ELANs.

With reference to FIG. 7, traffic forwarding and FDB association are as follows. A frame enters the proxy MPC 210 from legacy ELAN 214 through legacy LEC 230, and is associated (e.g. based on the identity of the LEC 230 or VLAN indication in the frame) with FDB 218, which is then used to find the egress port 222. The frame egresses the device 210 via port 222 to the loopback 226 and is received back in device 210 via port 224. It is then associated (e.g. based on the identity of port 224) with MPOA FDB 220 to find MPOA LEC 232, which forwards the frame to MPOA ELAN 216.

The reverse flow is similar. A frame enters from MPOA ELAN 216 through MPOA LEC 232. It is associated with MPOA FDB 220 in a similar way to that explained above. It is then sent to port 224, looped-back through loopback 226 to port 222, and is forwarded by means of legacy FDB 218 and legacy LEC 230 to legacy ELAN 214.

Presented hereinbelow is a configuration that can be used to minimize intra-VLAN traffic through the proxy MPC, and thus optimize network performance. An MPOA ELAN is restricted such that regular MPCs do not coexist with legacy LECs on the same VLAN/subnet. Such a restricted MPOA ELAN is termed 'shadow ELAN.' A shadow ELAN may contain only a single proxy MPC and one or more MPSs. The term shadow ELAN is derived from the fact that the actual VLAN is 'shadowed' through the proxy MPC. This ELAN is used only for connectivity with other subnets/VLANs and thus may contain only MPSs and one 'leg' of the proxy MPC. An ELAN that comprises only regular MPCs and MPSs (and no proxy MPCs or legacy LECs) is termed a 'pure MPOA' ELAN.

Figure 8:
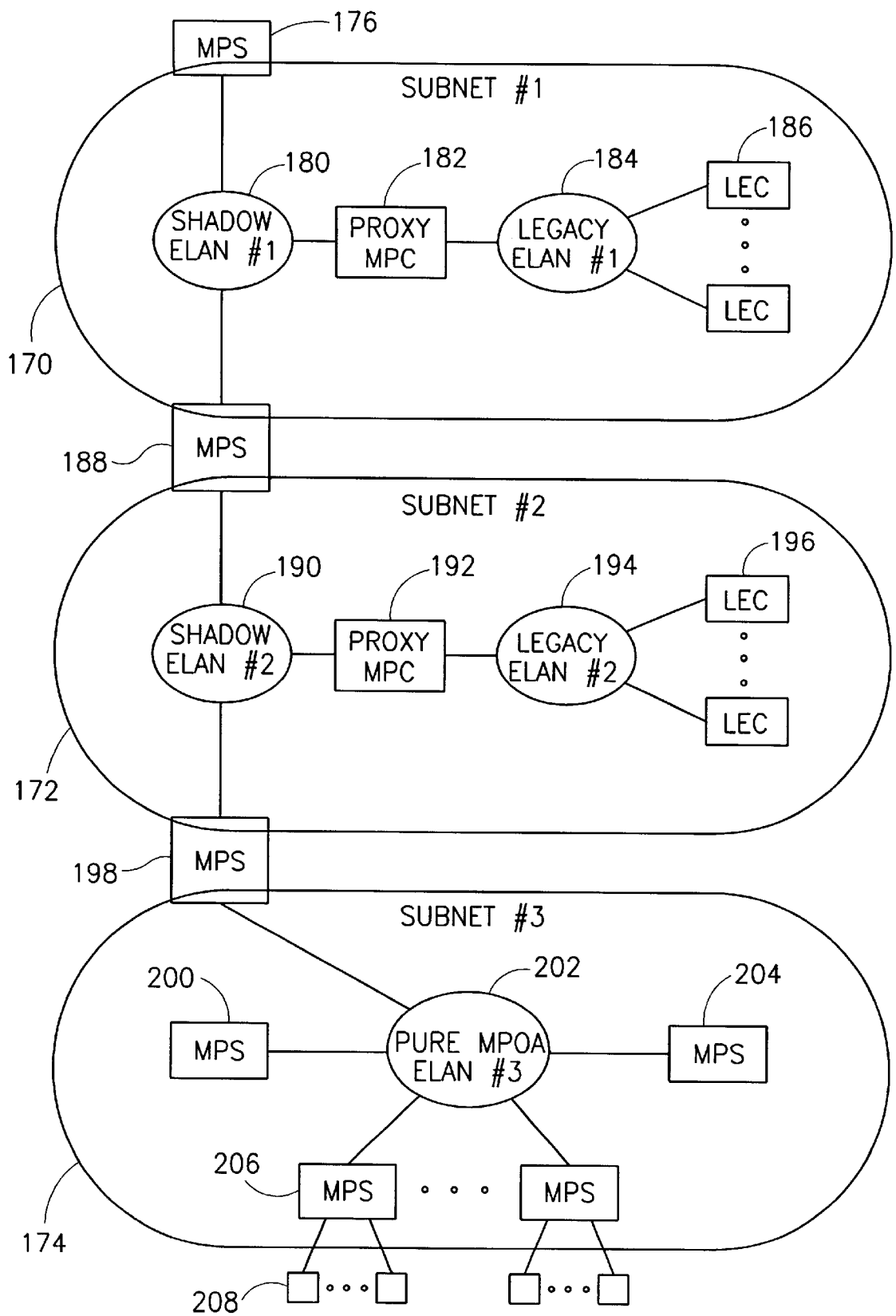
FIG. 8 is a block diagram illustrating the use of 'pure MPOA' ELANs within an ATM network.

A block diagram illustrating the use of shadow ELANs and pure MPOA ELANs within an ATM network is shown in FIG. 8. The network configuration shown in FIG. 8 comprises several subnets with proxy MPCs serving legacy LECs. In this configuration, intra and inter VLAN, i.e., subnet, traffic is separated as described above, i.e., regular MPCs and proxy MPCs do not reside on the same ELAN pair.

The network comprises three subnets, labeled subnet #1 170, subnet #2 172 and subnet #3 174. Subnet 170 comprises MPSs 176, 188, shadow ELAN #1 180, proxy MPC 182 and legacy ELAN #1 184 connected to a plurality of LECs 186. Subnet 172 comprises MPSs 188, 198, shadow ELAN #2 190, proxy MPC 192 and legacy ELAN #2 194 connected to a plurality of LECs 196. Subnet #3 174 comprises MPSs 198, 200, 204, pure MPOA ELAN #3 202, MPCs 206 connected to a plurality of end stations 208.

It is important to note that one skilled in the art can apply the principles of the present invention to any other layer 2 protocol that LANE is defined to operate with. Other layer 2 protocols include but are not limited to Token Ring, FDDI, etc.

While the invention has been described with respect to a limited number of embodiments, it will be appreciated that many variations, modifications and other applications of the invention may be made.

What is claimed is:

1. A proxy Multiprotocol Over ATM (MPOA) Client (MPC) for use in an ATM network including one or more legacy LAN Emulation Clients (LECs) that are not MPOA aware and at least one MPOA Server (MPS), comprising:
    a first port adapted to communicate data over a first Emulated LAN (ELAN) comprising a legacy ELAN;
    a second port adapted to communicate data over a second ELAN comprising an MPOA ELAN, said MPOA ELAN comprising an MPS, wherein said first port and said port are colocated within the same device;
    a first LEC adapted to reside on said first ELAN, said legacy LEC also residing on said first ELAN;
    a second LEC adapted to reside on said second ELAN, said MPS also residing on said second ELAN;
    a loopback connection adapted to loopback said first port and said second port such that traffic ingressed to said second port is treated as regular frames and provided MPC services; and
    a bridge adapted to steer traffic ingressing from said first ELAN via said first LEC over said loopback to egress to said second ELAN via said second LEC, said bridge adapted to steer traffic ingressing from said second ELAN via said second LEC over said loopback to egress to said first ELAN via said first LEC.

2. The proxy MPC according to claim 1, wherein said loopback connection comprises one or more internal loopback connections.

3. The proxy MPC according to claim 1, wherein said loopback connection comprises one or more external loopback connections.

4. The proxy MPC according to claim 1, wherein said bridge comprises:
    a first Forwarding Database (FDB) adapted to store mappings between said first ELAN and said first port for both ingress and egress directions; and
    a second Forwarding Database (FDB) adapted to store mappings between said second ELAN and said second port for both ingress and egress directions.

5. The proxy MPC according to claim 1, wherein said legacy LEC and said first LEC communicate via a LAN Emulation (LANE) Data Direct Virtual Circuit (DDVC).

6. The proxy MPC according to claim 1, wherein said second LEC and said MPS communicate via a LAN Emulation (LANE) Data Direct Virtual Circuit (DDVC).

7. The proxy MPC according to claim 1, wherein said second LEC is operative to forward traffic to said MPS using LANE mechanisms before an MPOA shortcut is established.

8. The proxy MPC according to claim 1, wherein said second LEC is operative to forward traffic to an MPOA shortcut once said MPOA shortcut is established.

9. The proxy MPC according to claim 1, wherein said first port comprises an Ethernet port adapted to transmit/receive Ethernet data to/from said first ELAN.

10. The proxy MPC according to claim 1, wherein said second port comprises an Ethernet port adapted to transmit/receive Ethernet data to/from said second ELAN.

11. The proxy MPC according to claim 1, wherein said first port comprises a Token Ring port adapted to transmit/receive Token Ring data to/from said first ELAN.

12. The proxy MPC according to claim 1, wherein said second port comprises a Token Ring port adapted to transmit/receive Token Ring data to/from said second ELAN.

13. The proxy MPC according to claim 1, wherein said first port comprises a port adapted to transmit/receive Layer 2 protocol data to/from said first ELAN.

14. The proxy MPC according to claim 1, wherein said second port comprises a port adapted to transmit/receive Layer 2 protocol data to/from said second ELAN.

15. A method of providing proxy Multiprotocol Over ATM (MPOA) Client (MPC) services to one or more legacy LAN Emulation Clients (LECs) that are not MPOA aware, in an Asynchronous Transfer Mode (ATM) network including at least one MPOA Server (MPS), said method comprising the steps of:
    forwarding frames from a legacy LEC to a first LEC, said first LEC and said legacy LEC residing on a first ELAN comprising a legacy ELAN;
    forwarding frames arriving to said first LEC to a first port;
    providing a second port adapted to communicate data over a second ELAN comprising an MPOA ELAN, said MPOA ELAN comprising an MPS, wherein said first port and said port are colocated within the same device;
    configuring a bridge so as to forward traffic arriving from said legacy LEC to said first port and to forward traffic ingressed to said second port to said MPS; and
    looping traffic arriving to said first port back to a second port thus causing traffic ingressed to said second port to be provided MPC services.

16. The method according to claim 15, further comprising the step of forwarding traffic to said MPS before an MPOA shortcut is established upon detecting initial traffic flow.

17. The method according to claim 15, further comprising the step of forwarding traffic to an MPOA shortcut once said MPOA shortcut is established.

18. The method according to claim 15, further comprising the step of communicating frames from said legacy LEC to said first LEC via a LAN Emulation (LANE) Data Direct Virtual Circuit (DDVC).

19. The method according to claim 15, further comprising the step of forwarding frames from a second LEC associated with the second port to said MPS via a LAN Emulation (LANE) Data Direct Virtual Circuit (DDVC).

20. The method according to claim 15, wherein said first port comprises an Ethernet port adapted to transmit/receive Ethernet data to/from said first ELAN.

21. The method according to claim 15, wherein said second port comprises an Ethernet port adapted to transmit/receive Ethernet data to/from said second ELAN.

22. The method according to claim 15, wherein said first port comprises a Token Ring port adapted to transmit/receive Token Ring data to/from said first ELAN.

23. The method according to claim 15, wherein said second port comprises a Token Ring port adapted to transmit/receive Token Ring data to/from said second ELAN.

24. The proxy MPC according to claim 15, wherein said first port comprises a port adapted to transmit/receive Layer 2 protocol data to/from said first ELAN.

25. The proxy MPC according to claim 15, wherein said second port comprises a port adapted to transmit/receive Layer 2 protocol data to/from said second ELAN.

* * * * *